(12) United States Patent
Grundmann et al.

(10) Patent No.: US 10,784,762 B1
(45) Date of Patent: Sep. 22, 2020

(54) TORQUE TRANSFER USING ELECTRO-PERMANENT MAGNETS

(71) Applicant: X Development LLC, Mountain View, CA (US)

(72) Inventors: Michael Grundmann, San Jose, CA (US); Jonathan Ross, Mountain View, CA (US)

(73) Assignee: X Development LLC, Mountain View, CA (US)

(*) Notice: Subject to any disclaimer, the term of this patent is extended or adjusted under 35 U.S.C. 154(b) by 506 days.

(21) Appl. No.: 15/393,294

(22) Filed: Dec. 29, 2016

Related U.S. Application Data

(60) Provisional application No. 62/428,009, filed on Nov. 30, 2016.

(51) Int. Cl.
*H02K 49/10* (2006.01)
*F16D 27/01* (2006.01)
(Continued)

(52) U.S. Cl.
CPC .......... *H02K 49/102* (2013.01); *F16D 27/01* (2013.01); *F16D 27/02* (2013.01); *F16D 27/14* (2013.01); *H02K 1/27* (2013.01); *H02K 3/28* (2013.01)

(58) Field of Classification Search
CPC .. H02K 3/28; H02K 3/34; H02K 1/27; H02K 49/10; H02K 49/102; F16D 27/01; F16D 27/02; F16D 27/14
(Continued)

(56) References Cited

U.S. PATENT DOCUMENTS 6,148,967 A * 11/2000 Huynh ................. H02K 49/043
188/161
7,764,020 B2 7/2010 Barnett
(Continued)

FOREIGN PATENT DOCUMENTS

WO WO 2009/069146 A1 6/2009
WO WO 2010/128527 A2 11/2010
(Continued)

OTHER PUBLICATIONS

Knaian, Ara Nerses, "Electropermanent Magnetic Connectors and Actuatore: Devices and Their Application in Programmable Matter," Massachusetts Institute of Technology, dated Jun. 2010, Part I pp. 1-103.
(Continued)

*Primary Examiner* — Shawki S Ismail
*Assistant Examiner* — Monica Mata
(74) *Attorney, Agent, or Firm* — Fish & Richardson P.C.

(57) ABSTRACT

An example apparatus includes a first disk that is rotatable and has a plurality of electro-permanent magnets disposed in a radial array on a surface of the first disk; and a second disk rotatably mounted adjacent to the first disk such that a gap separates the second disk from the first disk, where the second disk has a plurality of ferromagnetic elements disposed in respective radial array on a respective surface of the second disk. Applying an electric pulse to at least one electro-permanent magnet of the plurality of electro-permanent magnets changes a magnetic state of the electro-permanent magnet, thereby (i) generating an external magnetic field that traverses the gap between the first disk and the second disk and interacts with a corresponding ferromagnetic element of the plurality of ferromagnetic elements, and (ii) causing the second disk to rotate as the first disk rotates.

20 Claims, 10 Drawing Sheets

(51) Int. Cl.
*F16D 27/02* (2006.01)
*F16D 27/14* (2006.01)
*H02K 1/27* (2006.01)
*H02K 3/28* (2006.01)

(58) Field of Classification Search
USPC .......................................................... 310/103
See application file for complete search history.

(56) References Cited

U.S. PATENT DOCUMENTS

| | | | |
|---|---|---|---|
| 8,742,640 B1 * | 6/2014 | Albertson | ............ H02K 49/108 |
| | | | 310/103 |
| 2005/0099077 A1 * | 5/2005 | Gerfast | .................... H02K 7/11 |
| | | | 310/104 |
| 2010/0308519 A1 | 12/2010 | Sarda | |
| 2014/0202374 A1 | 7/2014 | Filosa et al. | |
| 2014/0285930 A1 | 9/2014 | Powell | |
| 2014/0354119 A1 * | 12/2014 | Shishido | ................ H02K 21/14 |
| | | | 310/68 B |

FOREIGN PATENT DOCUMENTS

| | | |
|---|---|---|
| WO | WO 2012/029073 A1 | 3/2012 |
| WO | WO 2014/033757 A1 | 3/2014 |
| WO | WO 2016/087998 A2 | 6/2016 |

OTHER PUBLICATIONS

Knaian, Ara Nerses, "Electropermanent Magnetic Connectors and Actuatore: Devices and Their Application in Programmable Matter," Massachusetts Institute of Technology, dated Jun. 2010, Part II pp. 104-206.

* cited by examiner

TORQUE TRANSFER USING ELECTRO-PERMANENT MAGNETS

CROSS REFERENCE TO RELATED APPLICATION

The present application claims priority to U.S. Provisional patent application Ser. No. 62/428,009, filed on Nov. 30, 2016, and entitled "Torque Transfer Using Electro-Permanent Magnets," which is herein incorporated by reference as if fully set forth in this description.

BACKGROUND

The term "transmission" may refer generally to systems that provide speed and torque conversions or transfer from a rotating power source to another rotary or linear device. Industrial machinery, medical robotics, and domestic electronics may utilize such transmissions. Selecting or designing a transmission involves considering multiple factors such as load capacity, efficiency, friction, backlash, stiffness, and cost.

SUMMARY

The present disclosure describes embodiments that relate to torque transfer using electro-permanent magnets.

In one aspect, the present disclosure describes an apparatus. The apparatus includes a first disk that is rotatable and has a plurality of electro-permanent magnets disposed in a radial array on a surface of the first disk; and a second disk rotatably mounted adjacent to the first disk such that a gap separates the second disk from the first disk. The second disk has a plurality of ferromagnetic elements disposed in respective radial array on a respective surface of the second disk. Applying an electric pulse to at least one electro-permanent magnet of the plurality of electro-permanent magnets changes a magnetic state of the electro-permanent magnet, thereby (i) generating an external magnetic field that traverses the gap between the first disk and the second disk and interacts with a corresponding ferromagnetic element of the plurality of ferromagnetic elements, and (ii) causing the second disk to rotate as the first disk rotates.

In another aspect, the present disclosure describes a clutch. The clutch includes a first disk that is rotatable and has a plurality of electro-permanent magnets disposed in a radial array on a surface of the first disk; and a second disk rotatably mounted adjacent to the first disk such that a gap separates the second disk from the first disk. The second disk has a plurality of ferromagnetic elements disposed in respective radial array on a respective surface of the second disk. A radial distance from a center of the first disk to electro-permanent magnets of the plurality of electro-permanent magnets is equal to a respective radial distance from a respective center of the second disk to ferromagnetic elements of the plurality of ferromagnetic elements. Applying an electric pulse to at least one electro-permanent magnet of the plurality of electro-permanent magnets changes a magnetic state of the electro-permanent magnet, thereby (i) generating an external magnetic field that traverses the gap between the first disk and the second disk and interacts with a corresponding ferromagnetic element of the plurality of ferromagnetic elements, and (ii) coupling the second disk to the first disk such that the second disk rotates as the first disk rotates.

In still another aspect, the present disclosure describes a transmission. The transmission includes a first disk that is rotatable and has a plurality of electro-permanent magnets disposed in a radial array on a surface of the first disk; and a second disk rotatably mounted adjacent to the first disk. The second disk has a plurality of ferromagnetic elements disposed in respective radial array on a respective surface of the second disk. The first disk and the second disk are juxtaposed on respective axially spaced planes and an axial gap separates the first disk from the second disk, and an axis of rotation of the first disk is offset from a respective axis of rotation of the second disk. Applying an electric pulse to at least one electro-permanent magnet of the plurality of electro-permanent magnets changes a magnetic state of the electro-permanent magnet, thereby (i) generating an external magnetic field that traverses the axial gap between the first disk and the second disk and interacts with a corresponding ferromagnetic element of the plurality of ferromagnetic elements, and (ii) causing the second disk to rotate as the first disk rotates.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1B:
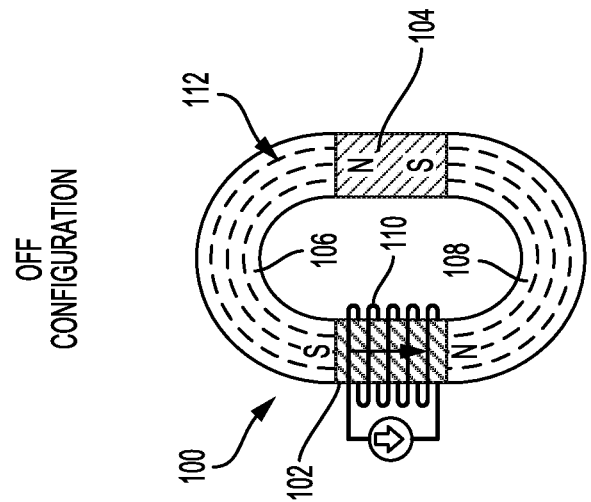
FIG. 1B illustrates the electro-permanent magnet of FIG. 1A in an "OFF" configuration, in accordance with an example implementation.

The following detailed description describes various features and functions of the disclosed systems with reference to the accompanying figures. The illustrative system and apparatus embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

Selecting or designing a torque transfer apparatus such as a transmission for a particular application involves considering multiple factors. Example factors of an operating environment include size, load capacity, efficiency, friction, desired speed reduction ratio, and cost. Transmission systems could be designed to have multiple speed reduction ratios. Achieving multiple speed reduction ratios may involve, for example, using multiple gears, thus increasing cost and size of the transmission. Further, transmission systems tend to be expensive if high performance, defined by parameters such as torque, efficiency, friction, backlash, etc., is desired. Hence, a transmission system that can improve efficiency by reducing or eliminating friction and reduce the size of the transmission and the cost of manufacturing can be beneficial.

Disclosed herein are apparatuses and systems that involve using electro-permanent magnets coupled to rotating components to transfer torque between the rotating components. Using electro-permanent magnets for torque transfer may enable the transfer of torque without the rotating components coming in contact with each other, thus reducing or eliminating sources of friction. Further, several reduction ratios could be achieved while reducing the size of the torque transfer apparatus.

II. Example Electro-Permanent Magnets

An electro-permanent magnet (EPM) is a type of magnet that includes both an electromagnet and a dual material permanent magnet. A magnetic field produced by the electro-magnet is used to change the magnetization of the permanent magnet. In an example, the permanent magnet includes magnetically soft and hard materials, where the soft material has lower magnetic coercivity compared to the hard material and can thus have its magnetization changed. When the magnetically soft and hard materials have opposite magnetizations, the EPM has no net field, and when they are aligned, the EPM generates an external magnetic field.

Figure 1A:
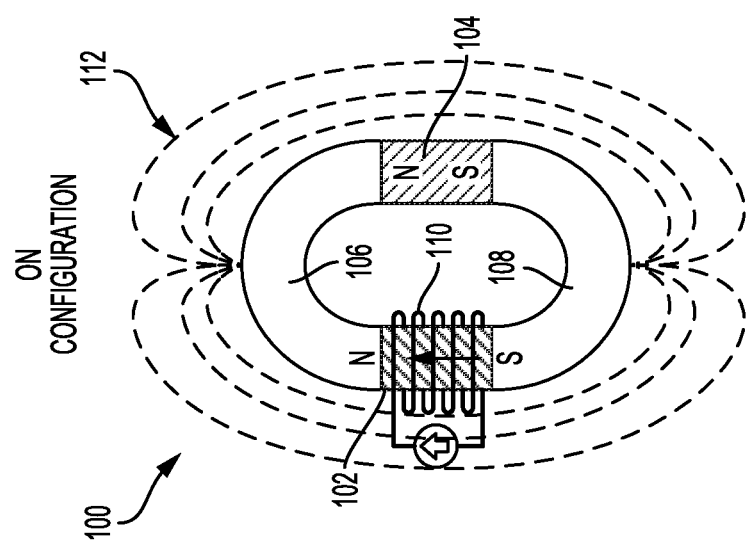
FIG. 1A illustrates an electro-permanent magnet in an "ON" configuration, in accordance with an example implementation.

FIG. 1A illustrates an EPM 100 in an "ON" configuration, and FIG. 1B illustrates the EPM in an "OFF" configuration, in accordance with an example implementation. The EPM 100 includes two permanent magnets 102 and 104 connected by u-shaped elements 106 and 108. The elements 106 and 108 could be made, for example, of a high magnetic permeability material or iron alloy such as magnet steel. As an example, the elements 106 and 108 could be made of Hiperco®, which includes an iron-cobalt-vanadium soft magnetic alloy that exhibits high magnetic saturation (24 kilogauss), high direct current maximum permeability, low direct current coercive force, and low alternating current core loss. However, other materials could be used.

The permanent magnet 102 is a low coercivity magnet. As an example, the permanent magnet 102 could include an iron alloy, which in addition to iron, may include aluminum (Al), nickel (Ni) and cobalt (Co), and thus this iron alloy may be referred to by the acronym AlNiCo. The permanent magnet 104 is a high coercivity magnet. As an example, the permanent magnet 104 could include N40 grade rare-earth magnets such as a neodymium magnet, also known as NdFeB, NIB or Neo magnet, which is a rare earth permanent magnet made from an alloy of neodymium, iron and boron. Both example materials, i.e., NdFeB and AlNiCo, may have the same remanence (around 1.3 Teslas) but AlNiCo has a lower intrinsic coercivity of 50 kiloamperes/meter (kA/m) while NdFeB has an intrinsic coercivity of 1120 kA/m. In the description provided herein AlNiCo and NdFeB are used as examples of materials for the permanent magnets 102 and 104; however, other materials could be used where one magnetic material has a lower coercivity than the other.

A coil 110 is wound around the permanent magnet 102. The coil 110 is designed such that if an electric pulse (e.g., electric current or voltage pulse) of sufficient power and duration is provided through the coil 110 in one direction, the generated magnetic field will be higher than the intrinsic coercivity ($H_{ci}$) of the permanent magnet 102, and can thus change is magnetic state or magnetization. In this case, the permanent magnet 102 will be magnetized in the direction of the field inside the coil 110. Applying an electric pulse in the opposite direction will lead to magnetize the permanent magnet 102 in the opposite direction.

For example, if the permanent magnet 102 is magnetized such that the north pole (N) of both permanent magnets 102 and 104 are pointing in the same direction (e.g., up in FIG. 1A), the magnetic configuration of FIG. 1A is obtained. Particularly, the element 106 would have two magnetic norths at its ends and the element 108 would have two magnetic souths (S) at its ends. In this case, the element 106 may operate as a north pole of the EPM 100, and the element 108 may operate as a south pole of the EPM 100. Further, the element 106 may concentrate generated magnetic flux lines 112, but might not contain the magnetic flux, and thus the magnetic flux will flow externally through the air (or other external medium) seeking the element 108 (magnetic south). In this configuration, the EPM 100 may be referred to as being in an "ON" state.

Applying an electric pulse through the coil 110 in the opposite direction magnetizes the permanent magnet 102 in the opposite direction. Thus, in this case, the element 106 would have a north pole (N) at one end and a south pole (S) at the other end, whereas the element 108 has opposite poles at its ends compared to the element 106 as illustrated in FIG. 1B. In this configuration, the magnetic flux lines 112 may be concentrated inside both elements 106 and 108 creating a closed circuit for the magnetic field because of the high permeability of the iron. However, no external magnetic field is generated and the EPM 100 may be referred to as being in an "OFF" state. In this manner, using an electric pulse through the coil 110, the magnetic state of the EPM 100 can be switched between the "ON" and "OFF" states.

Although FIGS. 1A-1B illustrate the coil 110 wound around the permanent magnet 102, but not the permanent magnet 104, in other example configurations, the coil 110 could be wound around both permanent magnets 102 and 104. As long as one of the magnets has lower intrinsic coercivity than the other, and the power of the electric pulse is less than a particular threshold, the magnetization direction of the magnet with lower coercivity would flip without changing the other's direction of magnetization assuming the power and duration.

Figure 2A:
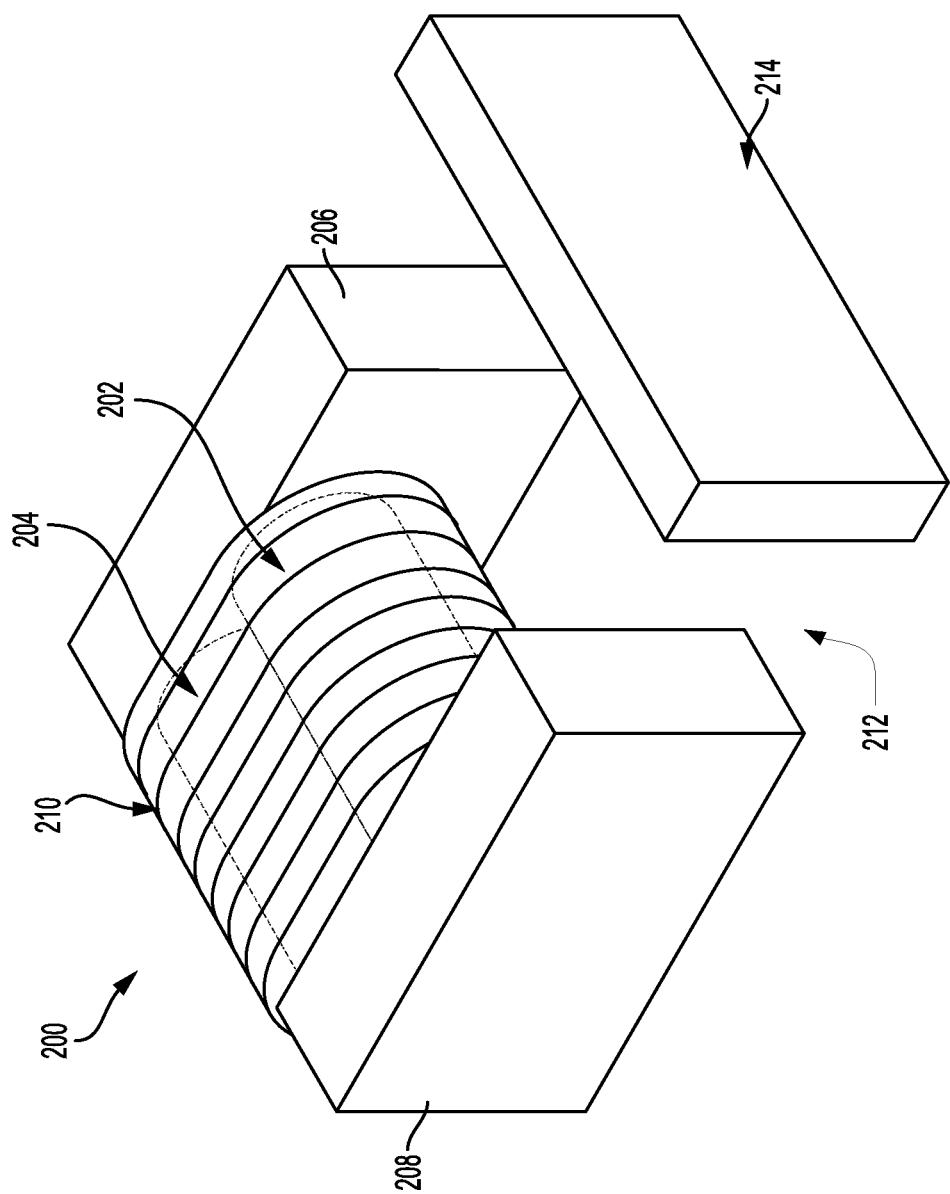
FIG. 2A illustrates an alternative configuration for an electro-permanent magnet, in accordance with an example implementation.

FIG. 2A illustrates an alternative configuration for an EPM 200, in accordance with an example implementation. As shown in FIG. 2A, the EPM 200 includes a first permanent magnet 202 made of, for example, AlNiCo and a permanent magnet 204 made of, for example, NdFeB. The permanent magnets 202 and 204 are disposed between keepers or elements 206 and 208 (made from magnet steel or Hiperco®, for example) configured to hold the permanent magnets 202 and 204 and concentrate magnetic flux lines. The permanent magnets 202 and 204 could be substantially parallel to each other. The permanent magnet 202 is shown disposed below the permanent magnet 204; however, other configurations are possible.

A coil 210 is wound around both permanent magnets 202 and 204. The coil 210 is designed such that if an electric pulse of sufficient power and duration is provided therethrough, the generated magnetic field will be higher than the intrinsic coercivity ($H_{ci}$) of the first permanent magnet 202, but not the second permanent magnet 204. Thus, magnetization of the first permanent magnet 202 may change, while magnetization of the second permanent magnet 204 remains unchanged.

When the EPM 200 is in the "ON" state with both permanent magnets 202 and 204 magnetized in the same direction, the generated external magnetic field traverses a gap 212 and interacts with a target object 214. Particularly, if the target object is made of a ferromagnetic material (e.g., magnet steel), then the generated external magnetic field may cause the target object 214 to be attracted to the EPM 200 and specifically to the elements 206 and 208. In some examples, the target object 214 could include a permanent magnet or another EPM.

Figure 2B:
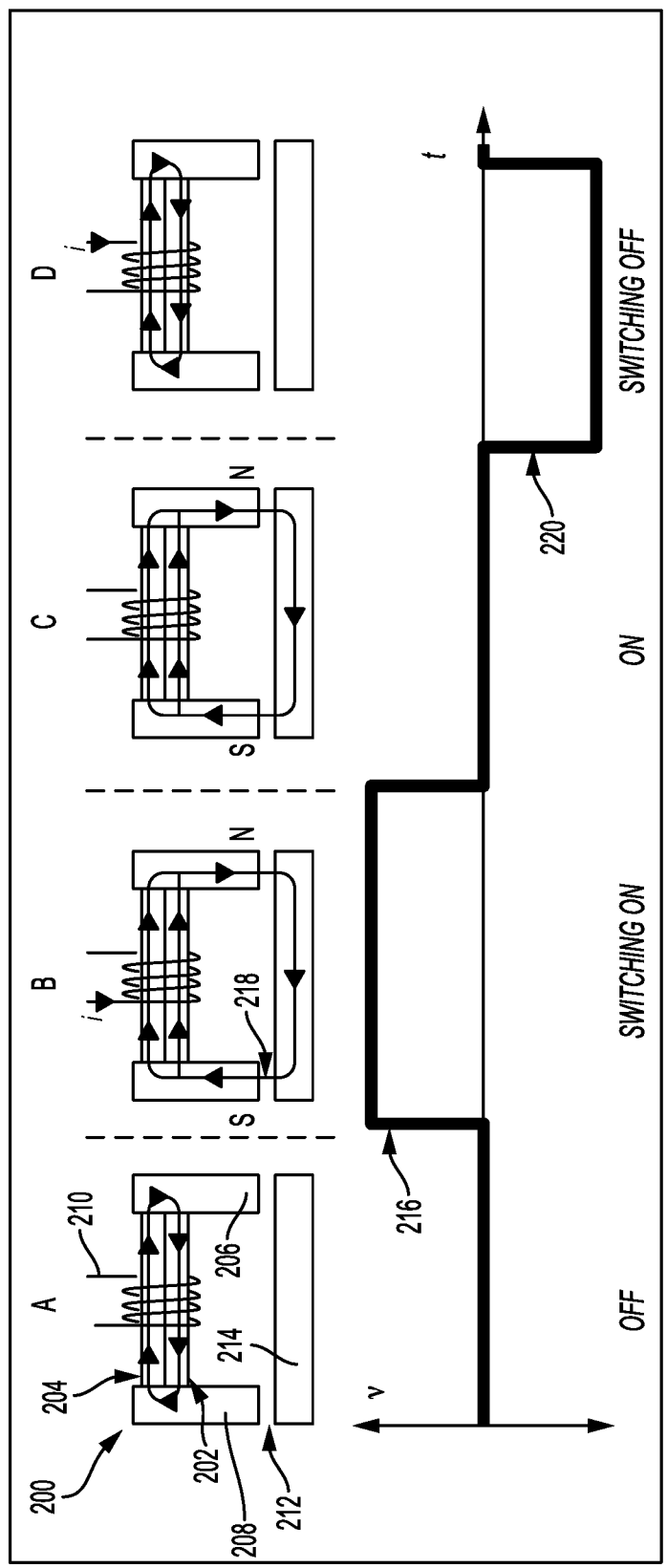
FIG. 2B illustrates operation of the electro-permanent magnet shown in FIG. 2A, in accordance with an example implementation.

FIG. 2B illustrates operation of the EPM 200 in conjunction with the target object 214, in accordance with an example implementation. FIG. 2B illustrates the EPM 200 in four states: A, B, C, and D. State A illustrates the EPM 200 in the "OFF" state, state B illustrates switching on the EPM 200, state C illustrates the EPM 200 in the "ON" state, and state D illustrates switching off the EPM 200. Reference numerals for the permanent magnets 202 and 204, the elements 206 and 208, the coil 210, the gap 212, and the target object 214 are shown in state A, but not the other states of FIG. 2B to reduce visual clutter in the drawing.

In the "OFF" state shown in state A, the two permanent magnets 202 and 204 are oppositely polarized, and thus the resulting magnetic flux is contained within the permanent magnets 202 and 204 and the elements 206 and 208, and no magnetic force acts on the target object 214. When a positive electric pulse 216 is provided through the coil 210 as shown in state B, a clockwise magnetic flux is imposed through the first permanent magnet 202 thus magnetizing it rightward such that both permanent magnets 202 and 204 are polarized in the same direction. As a result, the magnetic field of the first permanent magnet 202 reinforces the magnetic field of the second permanent magnet 204 and an external magnetic field represented by flux line 218 is generated. The element 206 operates as a north pole (N) and the element 208 operates as a south pole (S). The external magnetic field traverses the gap 212 and attracts the target object 214 toward the EPM 200.

The EPM 200 remains in the "ON" state even when the electric pulse 216 ends as shown in state C. Therefore, the EPM 200 is distinguished from electromagnets in that the EPM 200 may remain in the "ON" state without a continuous current through the coil 210. Thus the EPM 200 operates with a reduced power consumption compared to electromagnets.

When a negative electric pulse 220 is provided through the coil 210 as shown in state D, a counter-clockwise magnetic field represented by flux line 222 is imposed through the first permanent magnet 202 thus magnetizing it leftward such that the two permanent magnets 202 and 204 are oppositely polarized. The external magnetic field represented by the flux line 218 in state B then decays and disappears, and no magnetic force acts on the target object 214.

Thereafter, the EPM 200 reverts back to the "OFF" state illustrated in state A.

III. Example Torque Transfer Apparatuses and Systems

EPMs could be used to transfer torque from a rotating component to another, without the rotating components coming in contact with each other, thus eliminating friction and wear. Further, EPMs could be used to achieve multiple transmission speed reduction ratios in a compact package as described below.

Figure 3:
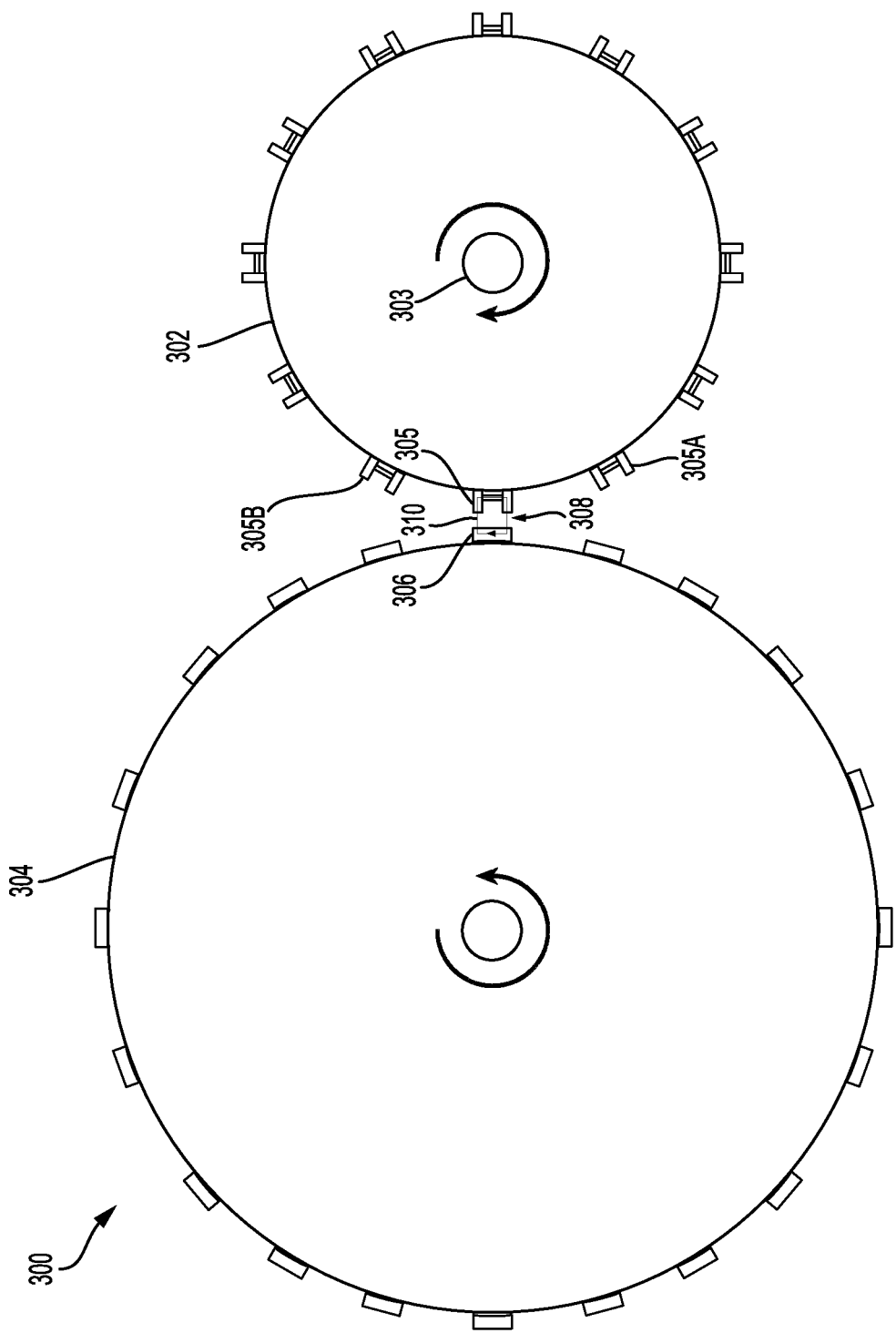
FIG. 3 illustrates a torque transfer apparatus, in accordance with an example implementation.

FIG. 3 illustrates a torque transfer apparatus 300, in accordance with an example implementation. The torque transfer apparatus 300 includes a first disk 302 and a second disk 304. The first disk 302 may be coupled to an input shaft 303 and is thus rotatable with the input shaft 303. As an example for illustration, the first disk 302 may be rotatable in a clockwise direction as shown in FIG. 3.

The first disk 302 may also have a plurality of EPMs 305 circumferentially spaced apart about a periphery or a peripheral surface of the first disk 302. The EPMs 305 may, for example, be similar to the EPM 200. In an example, the EPMs 305 may be equi-angularly spaced about the periphery of the first disk 302. However, in other examples, the EPMs 305 might not be equi-angularly spaced about the periphery of the first disk 302. The coils of the EPMs 305 are not shown in FIG. 3 to reduce visual clutter in the drawings.

The second disk 304 has a plurality of ferromagnetic elements 306 (e.g., made of magnet steel) circumferentially spaced apart about a periphery or a peripheral surface of the second disk 304. In an example, the ferromagnetic elements 306 may be equi-angularly spaced about the periphery of the second disk 304; however, in other examples, they might not be equi-angularly spaced about the periphery of the second disk 304. In the example implementation shown in FIG. 3, the first disk 302 and the second disk 304 are co-planar and are disposed in a radially spaced juxtaposed relation to one another such that a radial gap 308 separates the first disk 302 from the second disk 304. In an example, the EPMs 305 and ferromagnetic elements 306 have the same circumferential spacing around their respective disks.

If EPMs 305 are in the "OFF" state, then no external magnetic field is generated therefrom, and no substantial interaction occurs between the EPMs 305 and the ferromagnetic elements 306. Thus, if the first disk 302 rotates, it should impart no torque on the second disk 304.

If an electric pulse is provided to the coils of the EPMs 305, then the EPMs 305 switch to the "ON" state and an external magnetic field with flux lines 310 is generated therefrom. When a particular EPM 305 approaches a corresponding ferromagnetic element 306, a magnetic circuit is closed and the flux lines 310 pass through the ferromagnetic element 306 and attract it to the EPM 305. As a result, the second disk 304 is magnetically coupled to the first disk 302 and may rotate therewith if the first disk 302 is rotated. A particular EPM 305 is closest to the corresponding ferromagnetic element 306 at the 9 o'clock position from a perspective of a viewer of the first disk 302 in FIG. 3. Therefore, the magnetic circuit may be closed when the particular EPM 305 reaches the 9 o'clock position or slightly before the 9 o'clock position.

As the particular EPM 305 rotates away from the corresponding ferromagnetic element 306 during rotation of the first disk 302, the magnetic circuit might be opened; however, a subsequent EPM 305 approaches a corresponding ferromagnetic element 306 and another magnetic circuit is closed. Therefore, the second disk 304 may remain coupled to the first disk 302, and the two disks 302 and 304 rotate together.

In an example, the first disk 302 may have a different diameter compared to the second disk 304. For instance, as illustrated in FIG. 3, the diameter of the first disk 302 is smaller than the diameter of the second disk 304. Therefore, the apparatus 300 may operate as a speed reducer transmission. The rotational speed of the second disk 304 may be slower than the rotational speed of the first disk 302 by the ratio of the diameters of the second disk 304 to the diameter of the first disk 302. The torque produced by the second disk 304 may be amplified by the same ratio. Thus, the apparatus 300 operates as a transmission where torque and speed are transferred from one rotating component, i.e., the first disk 302, to a second rotating component, i.e., the second disk 304.

The apparatus 300 could also operate as a clutch. If a negative electric pulse is sent to the coils of the EPMs 305, the EPMs 305 switch back to the "OFF" state and the first and second disks 302 and 304 are decoupled or disengaged. To reengage the two disks 302 and 304, a positive electric pulse may be sent to the EPMs 305 to reestablish the external magnetic field, and thus couple the two disks 302 and 304 to transfer rotary motion again. Thus, the apparatus 300 may operate as an integrated clutch-transmission system.

In an example, electric pulses may be sent to the EPMs 305 together, such that the EPMs 305 switch to the "ON" state or to the "OFF" state together. In another example, electric pulses may be sent to the EPMs 305 in a particular temporal sequence. For instance, referring to FIG. 3, a positive electric pulse may be sent to the coil of a particular EPM when it reaches the position of EPM 305A to switch it to the "ON" state. As the particular EPM rotates away upon crossing the 9 o'clock position and reaching the position of EPM 305B, the particular EPM might not be sufficiently close to the corresponding ferromagnetic element to close the magnetic circuit and contribute to rotation of the second disk 304. Therefore, in examples, a negative electric pulse may be sent to the coil of the particular EPM when it reaches the position of EPM 305B to switch it to the "OFF" state. This way, the EPMs 305 do not remain continuously in the "ON" state, but exist in the "ON" state during a period of useful interaction with the ferromagnetic elements 306 to contribute to rotation of the second disk 304.

The ferromagnetic elements 306 could be made of magnet steel, but in examples could include permanent magnets. In other examples, the ferromagnetic elements 306 could include EPMs similar to the EPMs 305. In these examples, the EPMs 305 may be configured differently as described next.

Figure 4:
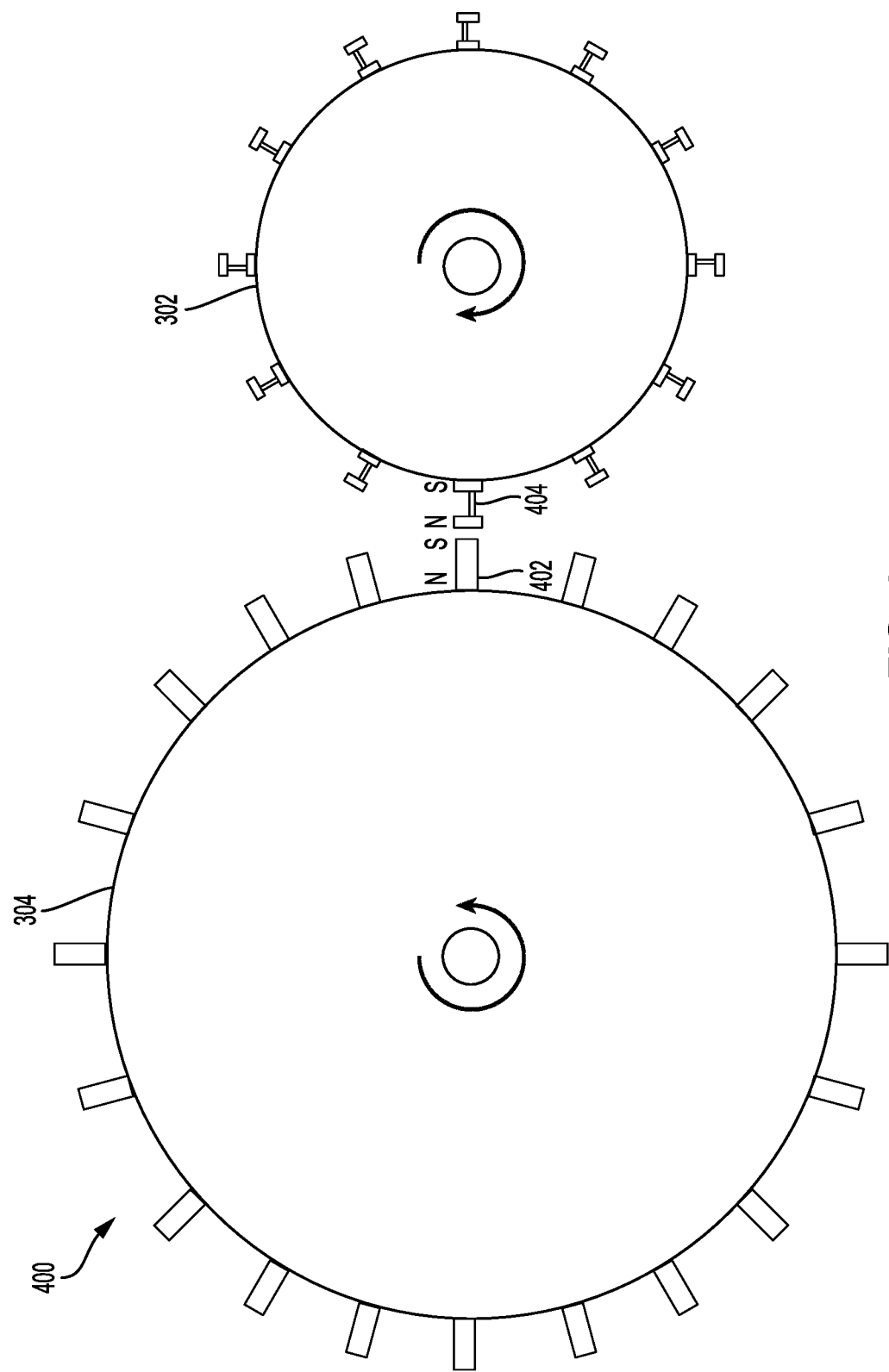
FIG. 4 illustrates a torque transfer apparatus with an alternative configuration of ferromagnetic elements and electro-permanent magnets, in accordance with an example implementation.

FIG. 4 illustrates a torque transfer apparatus 400 with an alternative configuration of ferromagnetic elements 402 and EPMs 404, in accordance with an example implementation. The EPMs 404 could be similar to the EPMs 305 or 200. As shown in FIG. 4, a given ferromagnetic element 402 is configured as a permanent magnet with its south pole (S) disposed toward an EPM 404, and its north pole (N) is coupled to the second disk 304. The EPM 404 is configured such that, in the "ON" state, its north pole (N) is disposed toward the ferromagnetic element 402, and its south pole (S) is coupled to the first disk 302. Therefore, when a positive electric pulse is sent to the EPM 404, an external magnetic field is generated such that the north pole of the EPM 404 faces the south pole of the ferromagnetic element (now a permanent magnet) 402, and the ferromagnetic element 402 is attracted to the EPM 404. As a result, the second disk 304 is coupled to and rotates with the first disk 302.

As mentioned above with respect to the EPMs 305 of FIG. 3, the EPMs 404 may be switched to the "ON" state and may remain in the "ON" state, when it is desired to couple the second disk 304 to the first disk 302. Alternatively, a given EPM 404 may be switched to the "ON" state at or before reaching the 9 o'clock position, and may be switched back to the "OFF" state after crossing the 9 o'clock position.

In another example implementation, the permanent magnet 402 and the EPMs 404 could alternatively be rotated by 90 degrees. As such, the north pole (N) and the south (S) pole of the permanent magnet 402 face or are adjacent to corresponding poles of the EPM 404 when switched to the "ON" state.

Figure 5:
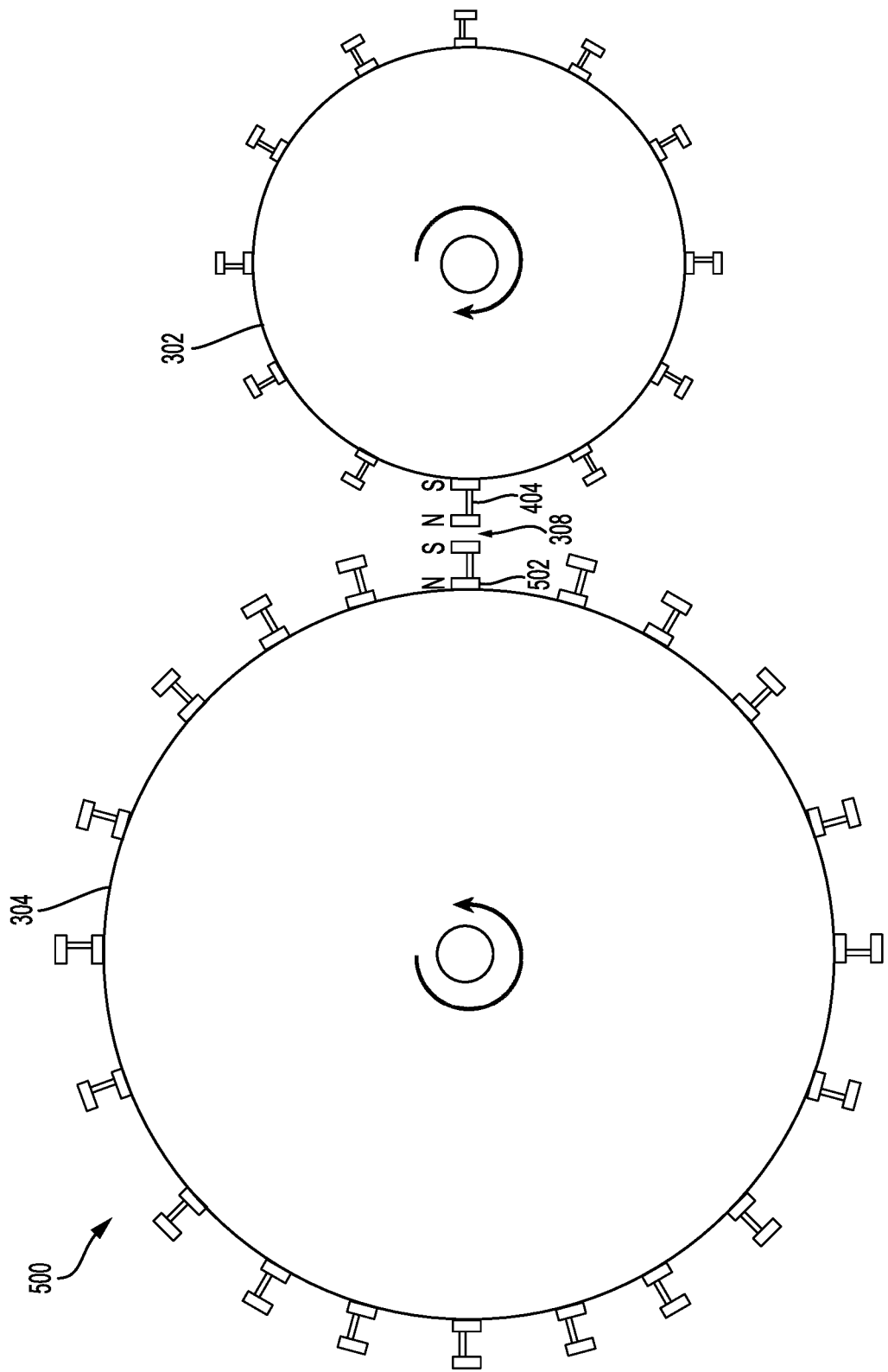
FIG. 5 illustrates a torque transfer apparatus with an alternative configuration of ferromagnetic elements, in accordance with an example implementation.

FIG. 5 illustrates a torque transfer apparatus 500 with another alternative configuration of ferromagnetic elements 502, in accordance with an example implementation. As shown in FIG. 5, a given ferromagnetic element 502 is configured as an EPM similar to the EPM 404, where, in the "ON" state, the EPM 502 has its south pole (S) disposed toward the EPM 404, and its north pole (N) is coupled to the second disk 304. The EPM 404 is configured to similar to its configuration in FIG. 4. Therefore, when a positive electric pulse is sent to both the EPM 404 and the EPM 502, external magnetic fields are generated such that the north pole of the EPM 404 is facing the south pole of the EPM 502, and the EPM 502 is attracted to the EPM 404. As a result, the second disk 304 is coupled to and rotates with the first disk 302.

The EPMs 404 may be switched to the "ON" state and may remain in the "ON" state, when it is desired to couple the second disk 304 to the first disk 302. Alternatively, a given EPM 404 and a corresponding EPM 502 may be switched to the "ON" state at or before reaching the 9 o'clock position and the corresponding EPM 502 reaching the 3 o'clock position. The given EPM 404 and the corresponding EPM 502 may be switched back to the "OFF" state after crossing the 9 o'clock position and the 3 o'clock positions, respectively.

In another example implementation, the EPM 502 and the EPMs 404 could alternatively be rotated by 90 degrees. As such, the north pole (N) and the south (S) pole of the EPM 502 face or are adjacent to corresponding poles of the EPM 404 when switched to the "ON" state.

In examples, the ferromagnetic elements 306 or 402 may be integrated or embedded within the second disk 304 as opposed to being separate components coupled thereto. Also, while the configurations shown in FIGS. 3-5 illustrate the disks 302 and 304 being disposed horizontally side-by-side, in other configurations they could be disposed at any angle side-by-side. For instance, the second disk 304 may be disposed below the first disk 302. In this configuration, an EPM (e.g., the EPM 305 or 404) of the first disk 302 would be closest to a corresponding ferromagnetic element (e.g., the ferromagnetic element 306, 402, or 502) when the EPM reaches the 6 o'clock position and the corresponding ferromagnetic element is at the 12 o'clock position.

Magnetic fields can act at a distance and they can act through non-magnetic barriers. Therefore, even if a barrier or bulkhead is disposed between the first disk 302 and the second disk 304, the apparatuses 300, 400, and 500 could still operate.

Figure 6B:
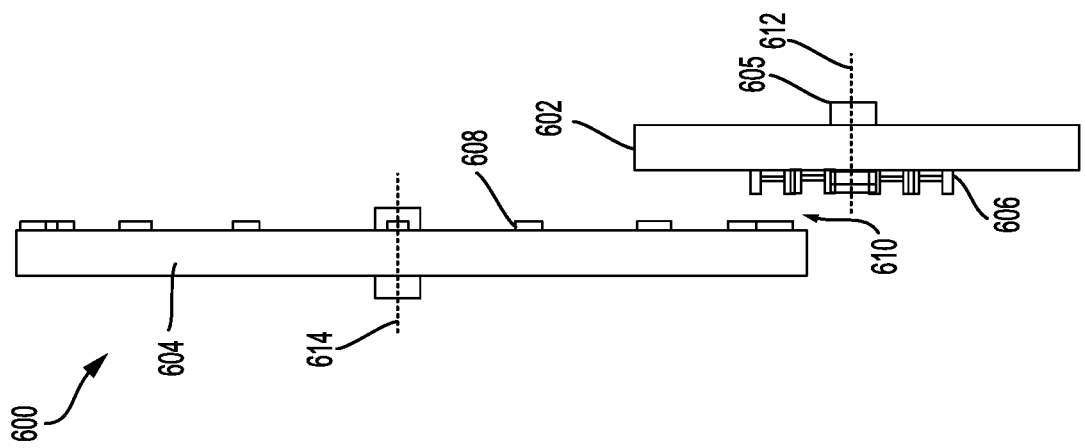
FIG. 6B illustrates a side view of the torque transfer apparatus of FIG. 6A, in accordance with an example implementation.
Figure 6A:
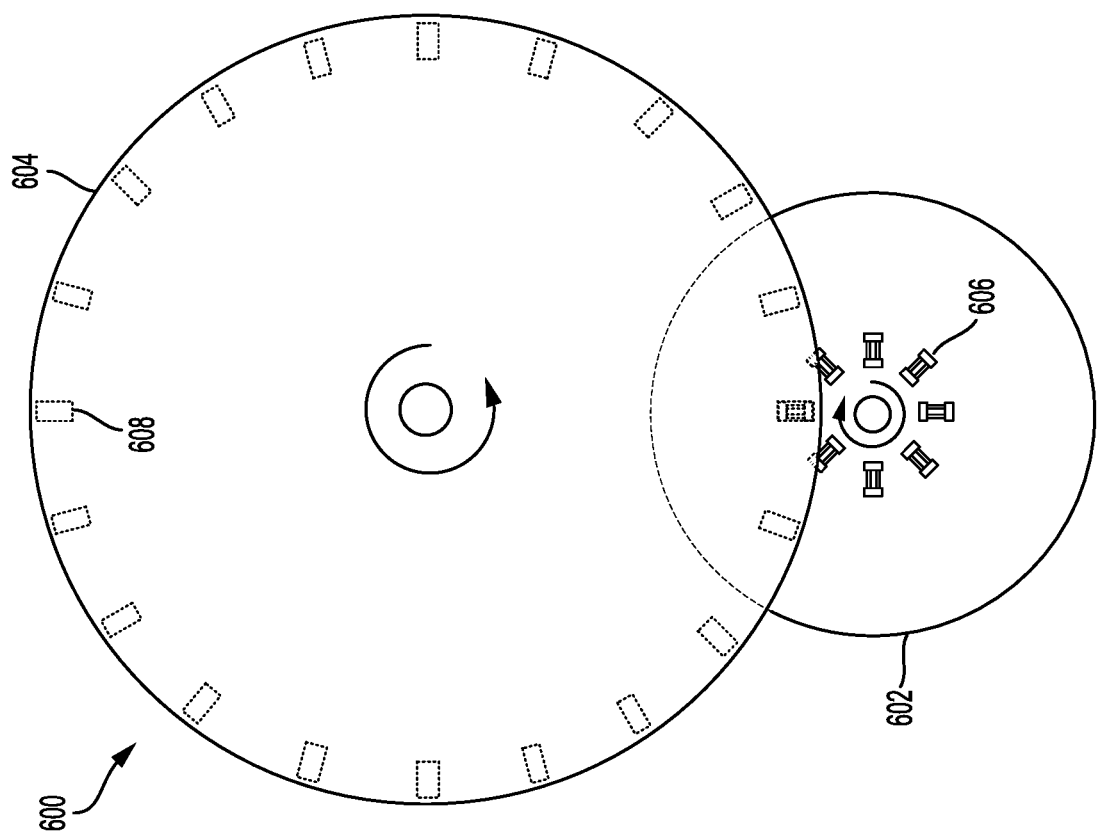
FIG. 6A illustrates a front view of another torque transfer apparatus, in accordance with an example implementation.

FIG. 6A illustrates a front view of another torque transfer apparatus 600, and FIG. 6B illustrates a side view of the torque transfer apparatus 600, in accordance with an example implementation. The torque transfer apparatus 600 includes a first disk 602 and a second disk 604. The first disk 602 may be coupled to an input shaft 605 shown in FIG. 6B and is thus rotatable therewith. As an example for illustration, the first disk 602 may be rotatable in a clockwise direction as shown in FIG. 6A.

The first disk 602 may also have a plurality of EPMs 606 disposed on at least one side face (e.g., front or back side face) or surface of the first disk 602. The EPMs 606 may be similar to the EPMs 200, for example. The EPMs 606 form a radial array about the side surface of the first disk 602. In an example, the EPMs 606 may be equi-angularly and equi-radially disposed about the side surface of the first disk 602. In other words, the EPMs 606 may be disposed at equal radial distance from a center of the first disk 602, and angles formed by any two lines connecting two consecutive EPMs 606 with the center of the first disk 602 are equal. However, in other examples, the EPMs 606 might not be equi-angularly spaced and might not be disposed at equal distance from the center of the first disk 602.

The second disk 604 has a plurality of ferromagnetic elements 608 (e.g., made of magnet steel, or includes permanent magnets and/or EPMs) that form a radial array about the side surface of the second disk 604 that faces the side surface of the first disk 602 having the EPMs 606. Similar to the EPMs 606 of the first disk 602, the ferromagnetic elements 608 may be equi-angularly and equi-radially disposed on the side surface of the second disk 604. However, in other examples, they might not be equi-angularly and equi-radially disposed about the side surface of the second disk 604.

The first disk 602 and the second disk 604 are juxtaposed on respective axially spaced planes such that an axial gap 610 separates the first disk 602 from the second disk 604 as shown in FIG. 6B. Axis of rotation 612 of the first disk 602 is offset from an axis of rotation 614 of the second disk 604. In this configuration, the radial array of EPMs 606 overlaps the radial array of ferromagnetic elements 608.

The torque transfer apparatus 600 operates similar to the torque transfer apparatuses 300, 400, and 500. If the EPMs 606 are in the "OFF" state, then no external magnetic field is generated therefrom, and no substantial interaction occurs between the EPMs 606 and the ferromagnetic elements 608. Thus, as the first disk 602 rotates the second disk 604 may remain stationary.

If an electric pulse is provided to the coils of the EPMs 606, then the EPMs 606 switch to the "ON" state and an external magnetic field is generated therefrom. When a particular EPM 606 approaches a corresponding ferromagnetic element 608, a magnetic circuit is closed and the external magnetic field attracts the ferromagnetic element to the EPM 606. As a result, the second disk 604 is magnetically coupled to the first disk 602 and rotates therewith.

As the particular EPM 606 rotates away from the corresponding ferromagnetic element 608, the magnetic circuit might be opened; however, a subsequent EPM 606 approaches a corresponding ferromagnetic element 608 and another magnetic circuit is closed. Therefore, the second disk 604 may remain coupled to the first disk 602, and the two disks 602 and 604 rotate together.

The ferromagnetic elements 608 could take any of the form discussed above with respect to the ferromagnetic elements 306. For example, the ferromagnetic elements 608 could include magnet steel blocks (see, e.g., FIG. 3), permanent magnets (see, e.g., FIG. 4), and/or EPMs (see, e.g., FIG. 5).

In an example, the EPMs 606 may be disposed at a radial distance from a center of the disk 602 that is different from a respective radial distance between a center of the second disk 604 and the ferromagnetic elements 608. For instance, as illustrated in FIG. 6A, a radius of the radial array of EPMs 606 is smaller than a radius of the radial array of ferromagnetic elements 608. Therefore, the apparatus 600 may operate as a speed reducer transmission. The rotational speed of the second disk 604 may be slower than the rotational speed of the first disk 602 by the ratio of the radii. The torque produced by the second disk 604 may be amplified by the same ratio. Thus, the apparatus 600 operates as a transmission where toque and speed are transferred from one rotating component, i.e., the first disk 602, to a second rotating component, i.e., the second disk 604.

The apparatus 600 could also operate as a clutch. If a negative electric pulse is sent to the coils of the EPMs 606, the EPMs 606 switch back to the "OFF" state and the first and second disks 602 and 604 are decoupled or disengaged. To reengage the two disks, a positive electric pulse is sent to the EPMs 606 to reestablish the external magnetic field and thus couple the two disks 602 and 604 to transfer rotary motion again. Thus, the apparatus 600 may operate as an integrated clutch-transmission system.

In an example, electric pulses could be sent to the EPMs 606 together, such that the EPMs 606 switch to the "ON" state or to the "OFF" state together. In another example, electric pulses may be sent to the EPMs 606 in a particular temporal sequence. For instance, a positive electric pulse may be sent to the coil of a particular EPM when it approaches a corresponding ferromagnetic element 608 (e.g., reaches a particular angle with respect to a horizontal or vertical line passing through the center of the first disk 602) to switch it to the "ON" state. As the particular EPM rotates away from the corresponding ferromagnetic element, it might not be sufficiently close to the corresponding ferromagnetic element to close the magnetic circuit and contribute to rotation of the second disk 604. Therefore, in examples, a negative electric pulse may be sent to the coil of the particular EPM to switch it to the "OFF" state upon moving away from the corresponding ferromagnetic element (e.g., upon reaching another angle with respect to the horizontal or vertical line passing through the center of the first disk 602). A controller of the torque transfer apparatus 600 may be configured to receive sensor information indicating an angle of rotation of the first disk 602 so as to provide appropriate pulses (positive or negative) to the appropriate EPMs. This way, the EPMs 606 might not remain continuously in the "ON" state, but exist in the "ON" state during a period of useful interaction with the ferromagnetic elements 608 to contribute to rotation of the second disk 604.

Figure 7:
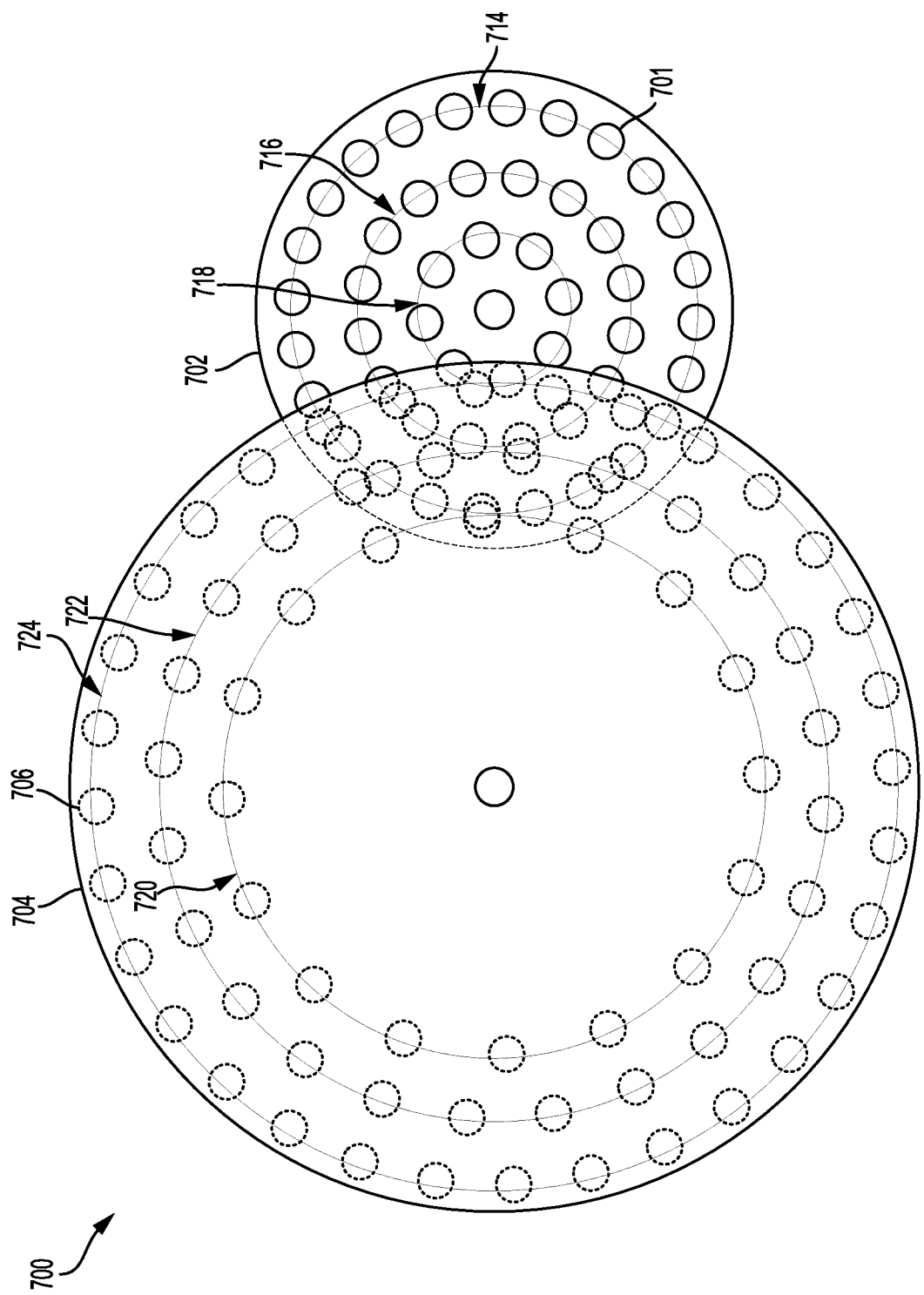
FIG. 7 illustrates a torque transfer apparatus with electro-permanent magnets forming concentric radial arrays, in accordance with an example implementation.

FIG. 7 illustrates a torque transfer apparatus 700 with EPMs 701 forming concentric radial arrays, in accordance with an example implementation. The EPMs 701 are represented as circles to simplify the drawing. The EPMs 701 could for example be similar to the EPMs 200. As shown in the configuration of FIG. 7, the side surface of a first disk 702 has a plurality of concentric radial arrays of EPMs 701 disposed thereon. For instance, the first disk 702 has three concentric radial arrays 714, 716, and 718 on its side surface. Similarly, ferromagnetic elements 706 of a second disk 704 form a corresponding plurality of concentric radial arrays 720, 722, and 724 on the side surface of the second disk 704 that faces the first disk 702.

Each of the radial arrays of EPMs 701 has a corresponding radial array of ferromagnetic elements 706. For instance, the radial array 720 corresponds to the radial array 714; the radial array 722 corresponds to the radial array 716; and the radial array 724 corresponds to the radial array 718. This way, each radial array of EPMs 701 disposed at a particular radial distance from a center of the first disk 702 is axially adjacent to a corresponding radial array of ferromagnetic elements 706 disposed at a respective radial distance from a center of the second disk 704 different from the particular radial distance of the radial array of EPMs 701.

In examples, a given radial array of EPMs (e.g., the radial array 714) has a number of EPMs 701 that is different from a number of ferromagnetic elements 706 of a corresponding radial array of ferromagnetic elements (e.g., the radial array 720). Also, each radial array of EPMs may have a different number of EPMs 701 from other radial arrays of EPMs, and each radial array of ferromagnetic elements may have a different number of ferromagnetic elements 706 from other radial arrays of ferromagnetic elements.

In this configuration, the speed reduction ratio and torque amplification ratio of the torque transfer apparatus 700 may be varied by selecting which radial array of EPMs to actuate or switch to the "ON" state. For example, if the EPMs 701 of the radial array 714 are switched to the "ON" state, a smaller speed reduction ratio and smaller torque amplification may result than if EPMs 701 of the radial array 718 are switched to the "ON" state. Thus, the speed reduction ratio and torque amplification ratio could be varied electronically by selecting which radial array of EPMs to switch to the "ON" state. In this manner, several ratios could be achieved using the same first and second disks 702 and 704 in a compact package versus using multiple gears having different diameters.

The apparatus 700 could also operate as a clutch. If a negative electric pulse is sent to the coils of the EPMs 701, the EPMs 701 switch back to the "OFF" state and the first and second disks 702 and 704 are decoupled or disengaged. To reengage the two disks 702 and 704, a positive electric pulse is sent to the EPMs 701 to reestablish the external magnetic field and thus couple the two disks 702 and 704 to transfer rotary motion again. Thus, the apparatus 700 may operate as an integrated clutch-transmission system.

Figure 8:
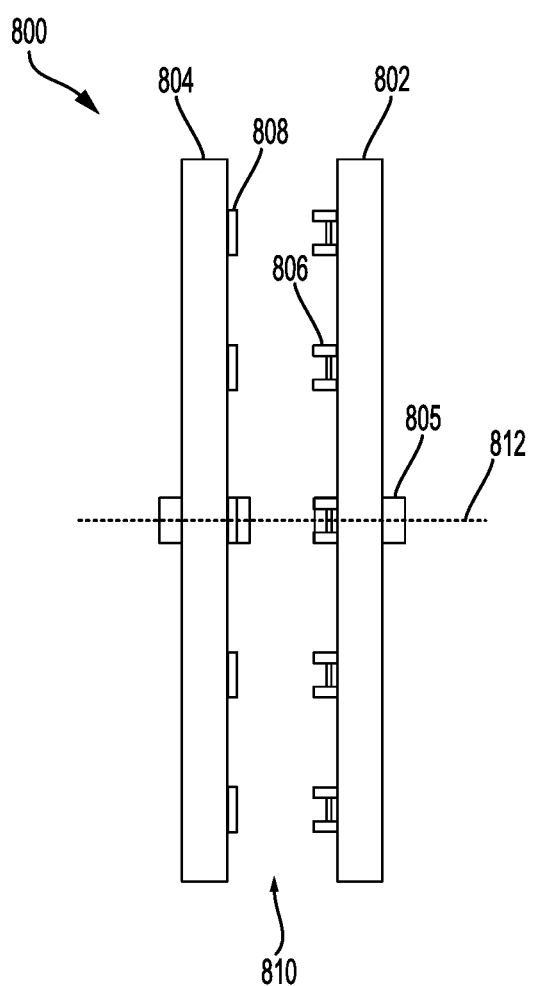
FIG. 8 illustrates a side view a clutch, in accordance with an example implementation.

FIG. 8 illustrates a side view of a clutch 800, in accordance with an example implementation. The clutch 800 includes a first disk 802 and a second disk 804. The first disk 802 may be coupled to an input shaft 805 and is thus rotatable therewith. The first disk 802 may also have a plurality of EPMs 806 disposed on at least one side surface of the first disk 802. The EPMs 806 form a radial array about the side surface of the first disk 802. In an example, the EPMs 806 may be equi-angularly and equi-radially disposed about the side surface of the first disk 802. However, in other examples, the EPMs 806 might not be equi-angularly spaced and might not be disposed at equal distance from the center of the first disk 802.

The second disk 804 has a plurality of ferromagnetic elements 808 (e.g., made of magnet steel, or includes permanent magnets and/or EPMs) that form a radial array about the side surface of the second disk 804 that faces the side face of the first disk 802 having the EPMs 806. Similar to the EPMs 806 of the first disk 802, the ferromagnetic elements 808 may be equi-angularly and equi-radially disposed on the side of the second disk 804. However, in other examples, they might not be equi-angularly and equi-radially disposed about the side surface of the second disk 804.

The first disk 802 and the second disk 804 are juxtaposed on respective axially spaced planes such that an axial gap 810 separates the first disk 802 from the second disk 804. As shown in FIG. 8, in an example, axes of rotation of both the first and second disk 802 and 804 may be coincident and represented by axis 812. However, in another example, the axes of rotation may be offset relative to each other similar to the apparatus 600 shown in FIG. 6B. In another example, the first disk 802 and second disk 804 may be arranged similar to the apparatus 300 with a radial gap instead of an axial gap. In this example, the EPMs 806 and the ferromagnetic elements 808 may be arranged on peripheries of their respective disk. In these examples, the radial distance from the center of the first disk 802 to the EPMs 806 and the radial distance from the center of the second disk 804 to the ferromagnetic elements 808 may be equal. As a result, no speed reduction occurs and the clutch 800 operates just as a clutch as opposed to a clutch and a speed reducer like the apparatuses 300, 400, 500, 600, and 700.

The clutch 800 operates similar to the torque transfer apparatuses 300, 400, 500, 600, and 700. If EPMs 806 are in the "OFF" state, then no external magnetic field is generated therefrom, and no substantial interaction occurs between the EPMs 806 and the ferromagnetic elements 808. Thus, as the first disk 802 rotates, the second disk 804 might not rotate therewith.

If an electric pulse is provided to the coils of the EPMs 806, then the EPMs 806 switch to the "ON" state and an external magnetic field is generated therefrom. When a particular EPM 806 approaches a corresponding ferromagnetic element 808, a magnetic circuit is closed and the external magnetic field attracts it to the EPM 806. As a result, the second disk 804 is magnetically coupled to the first disk 802 and rotates therewith.

The ferromagnetic elements 808 could take any of the form discussed above with respect to the ferromagnetic elements 306. For example, the ferromagnetic elements could include magnet steel blocks (see, e.g., FIG. 3), permanent magnets (see, e.g., FIG. 4), and/or EPMs (see, e.g., FIG. 5).

If a negative electric pulse is sent to the coils of the EPMs 806, the EPMs 806 switch back to the "OFF" state and the first and second disks 802 and 804 are decoupled or disengaged. To reengage the two disks, a positive electric pulse is sent to the EPMs 806 to reestablish the external magnetic field and thus couple the two disks to transfer rotary motion again. Thus, the apparatus 800 operates as a clutch.

In the example apparatuses 300, 400, 500, 600, 700, and 800, disks are used as an example for illustration. Similar implementations could be achieved with rotary components having conical faces, or worm drives, for example. Further, the disks (e.g., the disks 302 and 304, 602 and 604, or 702 and 704) could be disposed at 90° angle or some other angle relative to each other, i.e., the input and output shafts could be at an angle greater than zero relative to each other.

Figure 9:
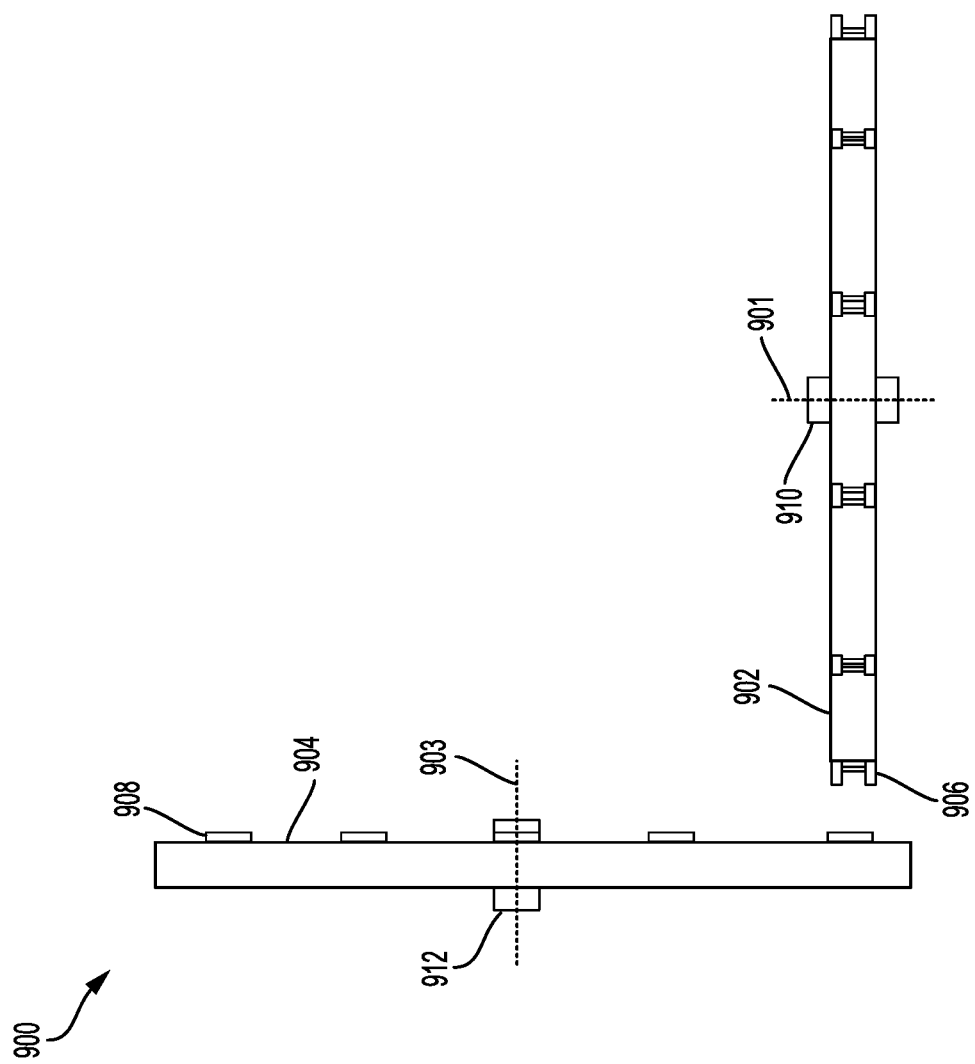
FIG. 9 illustrates a torque transfer apparatus with an axis of rotation of a first disk being perpendicular to an axis of rotation or a second disk, in accordance with an example implementation.

FIG. 9 illustrates a torque transfer apparatus 900 with an axis of rotation 901 of a first disk 902 being perpendicular to an axis of rotation 903 of a second disk 904, in accordance with an example implementation. The first disk 902 has a plurality of EPMs 906 disposed about a periphery thereof similar to the disk 302. The EPMs 906 could be, for example, similar to the EPMs 200. The second disk 904 has a plurality of ferromagnetic elements 908 that could include magnet steel, permanent magnets, and/or EPMs.

The first disk 902 is configured to rotate with an input shaft 910. If the EPMs 906 are energized, then they interact with the corresponding ferromagnetic elements 908 as described above with respect to the apparatuses 300, 400, 500, 600, 700, and 800. As a result, the disk 904 also rotates along with an output shaft 912. In this manner, the rotary motion of the first disk 902 about the axis 901 causes rotation of the second disk 904 about the axis 903 that is perpendicular to the axis 901. Other angles could be implemented as well.

The apparatuses and systems described above allow for high switching speeds as switching occurs by providing an electric pulse. The electric pulse has a finite duration (e.g., 200 milliseconds) and could be provided in a response time of 100 milliseconds making switching a clutch or switching to a different speed reduction ratio of a transmission quick. Also, the apparatus and systems described above have low power consumption because EPMs consume power when switching, as opposed to continuous consumption of power.

The apparatuses and systems described above involve a reduced number of moving parts compared to traditional transmissions and clutches and eliminate friction between moving parts, thus increasing efficiency and reliability. Further, multiple apparatus 300 or 400 could be mounted in series to achieve arbitrary speed reduction and torque amplification ratios.

IV. Conclusion

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
   a first disk that is rotatable and has a plurality of electro-permanent magnets disposed in a radial array on a surface of the first disk, each electro-permanent magnet comprising an electromagnet coil encircling at least a first permanent magnet; and
   a second disk rotatably mounted adjacent to the first disk such that a gap separates the second disk from the first disk, wherein the second disk has a plurality of ferromagnetic elements spaced apart from one another and disposed in respective radial array on a respective surface of the second disk,
   wherein applying an electric pulse to at least one electro-permanent magnet of the plurality of electro-permanent magnets changes a magnetic state of the electro-permanent magnet, thereby (i) generating an external magnetic field that traverses the gap between the first disk and the second disk and interacts with a corresponding ferromagnetic element of the plurality of ferromagnetic elements, and (ii) causing the second disk to rotate as the first disk rotates.

2. The apparatus of claim 1, wherein the first permanent magnet is made of a first material having a first magnetic coercivity, and each electro-permanent magnet of the plurality of electro-permanent magnets includes a second permanent magnet made of a second material having a second magnetic coercivity higher than the first magnetic coercivity, wherein applying the electric pulse changes a respective magnetic state of the first permanent magnet thereby reinforcing a magnetic field of the second permanent magnet to generate the external magnetic field.

3. The apparatus of claim 1, wherein the plurality of ferromagnetic elements comprises permanent magnets.

4. The apparatus of claim 1, wherein the plurality of ferromagnetic elements comprises electro-permanent magnets.

5. The apparatus of claim 1, wherein the first disk and the second disk are co-planar and in a radially spaced juxtaposed relation to one another such that the gap is a radial gap that separates the first disk from the second disk.

6. The apparatus of claim 1, wherein the plurality of electro-permanent magnets are circumferentially spaced apart about a periphery of the first disk, and wherein the plurality of ferromagnetic elements are circumferentially spaced apart about a respective periphery of the second disk.

7. The apparatus of claim 1, wherein electro-permanent magnets of the plurality of electro-permanent magnets are equi-angularly spaced and equi-radially disposed on the surface of the first disk.

8. The apparatus of claim 1, wherein a radial distance from a center of the first disk to electro-permanent magnets of the plurality of electro-permanent magnets is different from a respective radial distance from a respective center of the second disk to ferromagnetic elements of the plurality of ferromagnetic elements.

9. The apparatus of claim 1, wherein the first disk and the second disk are juxtaposed on respective axially spaced planes such that the gap is an axial gap that separates the first disk from the second disk, and wherein an axis of rotation of the first disk is offset from a respective axis of rotation of the second disk.

10. The apparatus of claim 9, wherein the plurality of electro-permanent magnets form a plurality of concentric radial arrays on the surface of the first disk, and wherein the plurality of ferromagnetic elements form a plurality of concentric radial arrays on the respective surface of the second disk, such that each radial array of electro-permanent magnets disposed at a radial distance from a center of the first disk is axially adjacent to a corresponding radial array of ferromagnetic elements disposed at a respective radial distance from a center of the second disk different from the radial distance.

11. The apparatus of claim 10, wherein a given radial array of electro-permanent magnets has a number of electro-permanent magnets that is different from a number of ferromagnetic elements of a given corresponding radial array of ferromagnetic elements.

12. The apparatus of claim 9, wherein each radial array of electro-permanent magnets has a different number of electro-permanent magnets from other radial arrays of electro-permanent magnets, and wherein each radial array of ferromagnetic elements has a different number of ferromagnetic elements from other radial arrays of ferromagnetic elements.

13. A clutch comprising:
   a first disk that is rotatable and has a plurality of electro-permanent magnets disposed in a radial array on a surface of the first disk, each electro-permanent magnet comprising an electromagnet coil encircling at least a first permanent magnet; and a second disk rotatably mounted adjacent to the first disk such that a gap separates the second disk from the first disk, wherein the second disk has a plurality of ferromagnetic elements spaced apart from one another and disposed in respective radial array on a respective surface of the second disk, and wherein a radial distance from a center of the first disk to electro-permanent magnets of the plurality of electro-permanent magnets is equal to a respective radial distance from a respective center of the second disk to ferromagnetic elements of the plurality of ferromagnetic elements wherein applying an electric pulse to at least one electro-permanent magnet of the plurality of electro-permanent magnets changes a magnetic state of the electro-permanent magnet, thereby (i) generating an external magnetic field that traverses the gap between the first disk and the second disk and interacts with a corresponding ferromagnetic element of the plurality of ferromagnetic elements, and (ii) coupling the second disk to the first disk such that the second disk rotates as the first disk rotates.

14. The clutch of claim 13, wherein the first disk and the second disk are juxtaposed on respective axially spaced planes such that the gap is an axial gap that separates the first disk from the second disk, and wherein first disk and the second disk have coincident axes of rotation.

15. The clutch of claim 13, wherein the electric pulse is a positive electric pulse, and wherein applying a negative electric pulse to the at least one electro-permanent magnet of the plurality of electro-permanent magnets changes the magnetic state of the electro-permanent magnet, thereby decaying the external magnetic field and decoupling the second disk from the first disk.

16. The clutch of claim 13, wherein the first disk and the second disk are co-planar and in a radially spaced juxtaposed relation to one another such that the gap is a radial gap that separates the first disk from the second disk.

17. A transmission comprising:
a first disk that is rotatable and has a plurality of electro-permanent magnets disposed in a radial array on a surface of the first disk, each electro-permanent magnet comprising an electromagnet coil encircling at least a first permanent magnet; and a second disk rotatably mounted adjacent to the first disk, wherein the second disk has a plurality of ferromagnetic elements spaced apart from one another and disposed in respective radial array on a respective surface of the second disk, wherein the first disk and the second disk are juxtaposed on respective axially spaced planes and an axial gap separates the first disk from the second disk, and wherein an axis of rotation of the first disk is offset from a respective axis of rotation of the second disk, wherein applying an electric pulse to at least one electro-permanent magnet of the plurality of electro-permanent magnets changes a magnetic state of the electro-permanent magnet, thereby (i) generating an external magnetic field that traverses the axial gap between the first disk and the second disk and interacts with a corresponding ferromagnetic element of the plurality of ferromagnetic elements, and (ii) causing the second disk to rotate as the first disk rotates.

18. The transmission of claim 17, wherein the plurality of electro-permanent magnets form a plurality of concentric radial arrays on the surface of the first disk, and wherein the plurality of ferromagnetic elements form a plurality of concentric radial arrays on the respective surface of the second disk, such that each radial array of electro-permanent magnets disposed at a radial distance from a center of the first disk is axially adjacent to a corresponding radial array of ferromagnetic elements disposed at a respective radial distance from a center of the second disk different from the radial distance.

19. The transmission of claim 18, wherein a given radial array of electro-permanent magnets has a number of electro-permanent magnets that is different from a number of ferromagnetic elements of a given corresponding radial array of ferromagnetic elements.

20. The transmission of claim 18, wherein each radial array of electro-permanent magnets has a different number of electro-permanent magnets from other radial arrays of electro-permanent magnets, and wherein each radial array of ferromagnetic elements has a different number of ferromagnetic elements from other radial arrays of ferromagnetic elements.

* * * * *